US009011983B2

(12) United States Patent
Laksin et al.

(10) Patent No.: US 9,011,983 B2
(45) Date of Patent: Apr. 21, 2015

(54) PROCESS FOR CURING A COMPOSITION BY ELECTRON BEAM RADIATION, AND BY GAS-GENERATED PLASMA AND ULTRAVIOLET RADIATION

(75) Inventors: Mikhail Laksin, Boonton, NJ (US); Wolfgang Decker, Beaver Falls, PA (US); Siddharth Fernandes, Richmond Hill (CA)

(73) Assignees: IdeOn LLC, Hillsborough, NJ (US); Metallized Surface Technologies, LLC, Beaver Fall, PA (US)

( * ) Notice: Subject to any disclaimer, the term of this patent is extended or adjusted under 35 U.S.C. 154(b) by 410 days.

(21) Appl. No.: 13/558,726

(22) Filed: Jul. 26, 2012

(65) Prior Publication Data

US 2013/0029057 A1 Jan. 31, 2013

Related U.S. Application Data

(60) Provisional application No. 61/513,015, filed on Jul. 29, 2011.

(51) Int. Cl.

| | |
|---|---|
| ***C08F 2/54*** | (2006.01) |
| ***B05D 3/06*** | (2006.01) |
| ***B05D 3/04*** | (2006.01) |
| ***B05D 3/10*** | (2006.01) |
| ***B05D 3/14*** | (2006.01) |
| ***B05D 7/04*** | (2006.01) |

(52) U.S. Cl.
CPC .............. *B05D 3/066* (2013.01); *B05D 3/0493* (2013.01); *B05D 3/06* (2013.01); *B05D 3/068* (2013.01); *B05D 3/10* (2013.01); *B05D 3/147* (2013.01); *B05D 7/04* (2013.01); *B05D 2202/25* (2013.01); *B05D 2350/65* (2013.01)

(58) Field of Classification Search
CPC ........ B05D 3/066; B05D 3/0493; B05D 3/06; B05D 3/068; B05D 3/10; B05D 3/147; B05D 7/04; B05D 2202/25; B05D 2350/65
USPC .......................... 427/487, 488, 493, 496, 508
See application file for complete search history.

(56) References Cited

U.S. PATENT DOCUMENTS

| | | | | |
|---|---|---|---|---|
| 4,058,400 | A | 11/1977 | Crivello | 522/31 |
| 4,058,401 | A | 11/1977 | Crivello | 430/280.1 |
| 4,219,654 | A | 8/1980 | Crivello | 546/342 |
| 4,490,516 | A | 12/1984 | Verbanac | 527/312 |
| 4,557,951 | A | 12/1985 | Verbanac | 527/312 |
| 5,079,378 | A | 1/1992 | Crivello | 556/64 |
| 5,260,349 | A | 11/1993 | Crivello | 522/31 |
| 5,550,265 | A | 8/1996 | Castellanos et al. | 556/7 |
| 5,668,192 | A | 9/1997 | Castellanos et al. | 522/31 |
| 5,877,229 | A | 3/1999 | Janke et al. | 522/31 |
| 6,040,040 | A | 3/2000 | Rainbow | |
| 6,147,184 | A | 11/2000 | Castellanos et al. | 528/410 |
| 6,153,661 | A | 11/2000 | Castellanos et al. | 522/31 |
| 6,270,841 | B1 | 8/2001 | Mikhael et al. | 427/255.6 |
| 6,284,816 | B1 | 9/2001 | Laksin et al. | 523/160 |
| 6,447,553 | B1 | 9/2002 | Mikhael et al. | 8/524 |
| 6,451,873 | B1 | 9/2002 | Stone et al. | 523/160 |
| 6,468,595 | B1 | 10/2002 | Mikhael et al. | 427/497 |
| 6,489,375 | B2 | 12/2002 | Stone et al. | 522/84 |
| 2010/0035003 | A1 | 2/2010 | Frances et al. | |
| 2011/0143046 | A1 | 6/2011 | Laksin et al. | |

FOREIGN PATENT DOCUMENTS

| | | | |
|---|---|---|---|
| CN | 1646572 | A | 7/2005 |
| WO | 03089479 | A2 | 10/2003 |

OTHER PUBLICATIONS

Crivello "UV and electron beam-induced cationic polymerization" Nuclear Instruments and Methods in Physics Research B 151 (1999) 8-21.*

* cited by examiner

*Primary Examiner* — Robert S Walters, Jr.
(74) *Attorney, Agent, or Firm* — Roberts & Roberts, LLP

(57) ABSTRACT

A process for producing polymeric films by applying a liquid composition onto a surface of a substrate under vacuum conditions in a vacuum chamber. The composition has a first component which is polymerizable or crosslinkable in the presence of a sufficient amount of an acid; and a cationic photoinitiator which generates an acid upon exposure to ultraviolet radiation, electron beam radiation or both to cause polymerizing or crosslinking of the first component. A gas which emits ultraviolet radiation upon exposure to electron beam radiation is introduced into the vacuum chamber. The composition and the gas are exposed to electron beam radiation to cause the cationic photoinitiator to generate an amount of an acid to cause polymerizing or crosslinking of the first component. The composition is exposed to both electron beam radiation and gas-generated ultraviolet radiation and cured.

20 Claims, No Drawings

PROCESS FOR CURING A COMPOSITION BY ELECTRON BEAM RADIATION, AND BY GAS-GENERATED PLASMA AND ULTRAVIOLET RADIATION

CROSS REFERENCE TO RELATED APPLICATION

This application claims the benefit of U.S. Provisional Patent Application Ser. No. 61/513,015 filed Jul. 29, 2011, which is incorporated herein by reference.

BACKGROUND OF THE INVENTION

1. Field of the Invention

The present invention relates to a radiation curable composition and a process for producing thin, solid, polymeric films, by liquid deposition on a substrate with subsequent ultraviolet radiation, plasma radiation and/or electron beam (e-beam) radiation curing. Each of the liquid deposition, e-beam curing, plasma curing, and UV curing are done in a vacuum chamber. The radiation curable composition comprises components which do not go into a gas phase or vapor phase under the vacuum conditions. The composition has a first component which is polymerizable or crosslinkable in the presence of an acid; and a cationic photoinitiator which generates an acid upon exposure to ultraviolet radiation, plasma radiation, electron beam radiation or combinations thereof, thus causing polymerizing or crosslinking of the first component. The UV radiation and plasma radiation are generated in-situ by irradiating a gas within the vacuum chamber which generates UV radiation and/or plasma radiation upon exposure to electron beam radiation.

2. Description of the Related Art

There is great commercial interest in applying protective and/or functional coatings over metalized film substrates directly inside of a vacuum chamber and curing them via electron beam, UV and plasma irradiation. A benefit of such curable compositions is that they are essentially completely solid when cured and do not transfer into the gas or vapor phase under the vacuum. Applying solid curable coatings under vacuum is beneficial for coating uniformity and adhesion to non-oxidized metal surfaces. This is beneficial in comparison to applying electron beam curable coatings in air over oxidized metal surfaces.

Thin metallic and polymeric films add or promote desirable properties for particular applications. For example, foils used to preserve food need to have very low permeability to oxygen; the exterior surface of packaging material has to be capable of accepting printing inks; and packaging materials for electronic products also require a limited amount of conductivity to dissipate electrostatic charges. It is desirable and sometimes necessary to modify the physical properties of polymeric films to improve their suitability for the intended purpose. Preferably, the films are directly formed with a composition and molecular structure characterized by the desired properties. Thin films of metals and polymers are formed by deposition onto appropriate substrates by a variety of known processes, most notably through film formation by wet chemistry or vapor deposition. Chemical processes produce soluble thermoplastic as well as insoluble thermoset polymers and involve the use of solvents; thus, film formation is achieved through solvent diffusion and evaporation. As a result, these processes require relatively long residence times and the undesirable step of handling solvents.

Vapor deposition processes involve the evaporation of a liquid monomer in a vacuum chamber, its deposition onto a cold substrate, and subsequent polymerization by exposure to electron beam or ultraviolet radiation. U.S. Pat. Nos. 6,270,841 and 6,447,553 illustrate a liquid monomer from a supply reservoir which is atomized in a heated evaporator section of a vacuum deposition chamber where it flash vaporizes under vacuum. The resulting monomer vapor passes into a condensation section of the unit where it is vapor applied onto a substrate, condenses and forms a thin liquid film upon contact with the cold surface of the substrate. The liquid deposited film is then cured by exposure to an electron beam or ultraviolet radiation source. A problem with such a technique is that the vaporized composition coats much of the inside of the equipment inside the vacuum chamber, and then cures into an unwanted solid on the equipment when irradiated. Such unwanted solids are difficult to remove.

Traditionally, electron beam curable coatings are mixtures of (meth)acrylate functional pre-polymers, oligomers and monomers that can undergo free-radical polymerization under exposure to electron beam irradiation. Typically, electron beam free radical polymerization is inhibited by the presence of oxygen and therefore electron beam coatings must cure under a nitrogen blanket. The complete curing requires a substantial electron beam dose.

According to this invention, a radiation curable composition is formed comprising a first component which is polymerizable or crosslinkable in the presence of a sufficient amount of an acid; and a cationic photoinitiator which generates a sufficient amount of an acid upon exposure to sufficient ultraviolet radiation, electron beam radiation, plasma radiation or combinations of two or more of ultraviolet radiation, plasma radiation and electron beam radiation, to cause polymerizing or crosslinking of the first component. The radiation curable composition is applied in liquid form onto a surface of a substrate under vacuum conditions in a vacuum chamber. The radiation curable composition does not substantially go into a gas phase or a vapor phase under the vacuum conditions. An important feature of the invention is introducing a gas into the chamber, which gas generates and emits ultraviolet radiation, plasma radiation, or combinations of ultraviolet radiation and plasma radiation upon exposure to electron beam radiation. The composition is further exposed to the gas generated ultraviolet radiation and/or plasma radiation, and optional e-beam radiation thus providing curing of the composition. The cationic photoinitiator generates an amount of an acid under the influence of the electron beam, plasma and/or ultraviolet radiation. The acid causes at least polymerizing or crosslinking of the first component.

UV cationic chemistry is well known for outstanding adhesion to plastic substrates and metals as shown in U.S. Pat. Nos. 6,284,816; 6,489,375; and 6,451,873. In most practical applications, cationic polymerization takes place under UV irradiation when cationic photoinitiators, such as onium salts, for example. sulfonium or iodonium hexafluoroantimonate or hexafluorophosphate disassociate, forming strong Lewis acids, capable of reacting with epoxy, vinyl ether or oxetane functional groups. It is also known that cationic polymerization can take place under e-beam irradiation as shown in U.S. Pat. Nos. 5,260,349 and 5,877,229. It is further known that e-beam cationic polymerization can take place inside of a vacuum chamber as in U.S. Pat. No. 6,468,595. E-beam cationic polymerization requires the presence of an onium salt photoinitiator. Unfortunately the rate of e-beam induced cationic reaction is relatively low in comparison with UV induced polymerization. This limits use of e-beam cationic polymerization in high speed coating applications taking place in a vacuum metallization chamber.

According to the present invention, introducing a flow of various gases or blends of gases through the electron generated electrodes inside of a vacuum chamber leads to the emission of light containing UV spectral output and/or plasma electrons, that is useful for polymerization. For further enhancing of the rate of electron beam, plasma radiation and ultraviolet light radiation induced polymerization, a photosensitizer, such as anthracene, isopropylthioxanthone or phenothiazine, which is capable of transferring energy from the visible and high ultra-violet ranges of light spectra down to lower wavelength ultra-violet ranges, may be included.

SUMMARY OF THE INVENTION

The invention provides a process for coating a substrate which comprises a) applying a radiation curable, liquid composition onto a surface of a substrate under vacuum conditions in a vacuum chamber, which composition does not substantially go into a gas phase or a vapor phase under said vacuum conditions, said composition comprising a first component which is polymerizable or crosslinkable in the presence of a sufficient amount of an acid; and a cationic photoinitiator which generates a sufficient amount of an acid upon exposure to sufficient ultraviolet radiation, electron beam radiation, plasma radiation or combinations of two or more of ultraviolet radiation, electron beam radiation and plasma radiation, to cause polymerizing or crosslinking of the first component;

b) introducing a gas into said chamber, which gas emits ultraviolet radiation, plasma radiation, or combinations of ultraviolet radiation and plasma radiation upon exposure to electron beam radiation; and c) exposing the gas to sufficient electron beam radiation to cause the gas to emit ultraviolet radiation, plasma radiation, or combinations of ultraviolet radiation and plasma radiation, thus exposing the composition to ultraviolet radiation, plasma radiation, or combinations of ultraviolet radiation and plasma radiation, which causes the cationic photoinitiator to generate acid, which acid causes polymerizing or crosslinking of the first component.

DESCRIPTION OF THE INVENTION

The invention requires the provision of a radiation curable, liquid composition which does not substantially go into a gas phase or a vapor phase under vacuum conditions. The composition comprising a first component which is polymerizable or crosslinkable in the presence of a sufficient amount of an acid. Non-exclusive examples of the first component include at least one of an oxirane ring containing compound, a vinylether containing compound, and an oxetane containing compound. Examples of the first component non-exclusively include Araldite GY 6010 (a reaction product of bisphenol A with epichlorohydrin; CAS 25068-38-6; available from Huntsman), Epon 58006 (CAS 25068-38-6; available from Hexion), Epodil 743 (a phenyl glycidyl ether); DER 736 (a diglycidyl ether of poly(propylene glycol); CAS 41638-13-5; available from Ted Pella), UVR-6110 (a cycloaliphatic epoxide; CAS 2386-87-0; available from Dow), and UVR-6128 (CAS 3130-19-8; available from Dow).

The liquid composition then comprises a cationic photoinitiator which generates a sufficient amount of an acid upon exposure to sufficient ultraviolet radiation, plasma radiation, electron beam radiation or combinations thereof to cause polymerizing or crosslinking of the first component. The cationic polymerization initiator non-exclusively includes onium salts of Group VIa elements, especially salts of positively charged sulfur. Useful cationic photoinitiators may be one or more onium salts such as a diazonium salt, sulfonium salt, iodonium salt, selenonium salt, bromonium salt, sulfoxonium salt, and chloronium salt.

Non-limiting examples of such cationic photoinitiators include diaryliodonium, triarylsulfonium, triarylselenonium, diaryliodonium, triarylsulfonium, triarylselenonium, diarylbromonium, diarylchloronium and phenacylsulfonium salts can be used. diaryliodonium, triarylsulfonium, triarylsulfoxonium, dialkylphenacylsulfonium and alkylhydroxyphenylsulfonium salts. These are described in U.S. Pat. Nos. 4,219,654; 4,058,400; 4,058,401 and 5,079,378. An example of a diaryldiazonium salt is 2,5-diethoxy-4(4-tolylthio)-benzenediazonium tetrafluoroborate. Other examples include triarylsulfonium and diaryliodonium salts containing non-nucleophilic counterions such as diphenyl iodonium chloride, diphenyl iodonium hexafluorophosphate, 4,4-dioctyloxydiphenyl iodonium hexafluorophosphate, triphenylsulfonium tetrafluoroborate, diphenyltolylsulfonium hexafluorophosphate, phenylditolylsulfonium hexafluoroarsenate, and diphenylthiophenoxyphenylsulfonium hexafluoroantimonate, and those available from Sartomer, Exton, Pa. under the SARCAT trade name, such as SARCAT CD 1010 [triaryl sulfonium hexafluoroantimonate (50% in propylene carbonate)]; SARCAT DC 1011 [triaryl sulfonium hexafluorophosphate (50% n-propylene carbonate)]; SARCAT DC 1012 (diaryl iodonium hexafluoroantimonate); SARCAT K185 [triaryl sulfonium hexafluorophosphate (50% in propylene carbonate)] and SARCAT SR1010 [triarylsulfonium hexafluoroantimonate (50% in propylene carbonate)]; and SARCAT SR1012 (diaryliodonium hexafluoroantimonate), and those available from Dow under the CYRACURE trade name, such as UVI-6976 mixture of triarylsulfonium hexafluoroantimonate salts in propylene carbonate. Other useful cationic photoinitiators include UV 9385C (an alkylphenyl iodonium hexafluorophosphate salts) and UV 9390C (an alkylphenyl iodonium/hexafluoroantimonate salt) available from General Electric Corporation; CGI 552 (an alkylphenyl iodonium hexafluorophosphate salt); and RAD-CURE UVACure 1590 available from UCB, Belgium; and a cationic photoinitiator for silicone-based release coatings, whose counter ion contains fluoride atoms covalently bound to aromatic carbon atoms of the counter ion, such as $B(C_6F_5)_4$ available from Rhodia Chemie. Some of these are described in International Patent Applications PCT/FR97/00566 and PCT/FR98/00741 as well as U.S. Pat. Nos. 5,550,265; 5,668,192; 6,147,184; and 6,153,661. Other examples of diarylionium salts include Irgacure 250 (4-methylphenyl-(4-(2-methylpropyl)phenyl)iodonium hexafluorophosphate; CAS 344562-80-7; available from Ciba Specialty Company) and diphenyliodonium hexafluorophosphate (CAS 58109-40-3); and UVI-6990 (mixed triarylsulfonium hexafluorophosphate salts in 50% propylene carbonate). Preferred cationic photoinitiator comprises a diaryl iodonium salt, a triaryl sulfonium salt or mixtures thereof.

The radiation curable liquid composition may comprise an organic, free radical polymerizable, ethylenically unsaturated component which is polymerizable or crosslinkable by the application of sufficient electron beam radiation, plasma radiation, and/or ultraviolet radiation. These are preferably a monomer, oligomer or polymer having at least one and preferably two olefinically unsaturated double bonds. Such are well known in the art. Useful free radical polymerizable, ethylenically unsaturated components include acrylates and methacrylates. These may comprise an ethylenically unsaturated acrylate monomer, methacrylate monomer, acrylate oligomer, methacrylate oligomer, acrylate polymer, methacrylate polymer or combinations thereof.

Suitable for use as polymerizable or crosslinkable components are ethers, esters and partial esters of acrylic acid, methacrylic acid, aromatic and aliphatic polyols preferably having from 2 to 30 carbon atoms, or cycloaliphatic polyols containing preferably 5 or 6 ring carbon atoms. These polyols can also be modified with epoxides such as ethylene oxide or propylene oxide. The partial esters and esters of polyoxyalkylene glycols are also suitable. Examples are ethylene glycol dimethacrylate, diethylene glycol dimethacrylate, triethylene glycol dimethacrylate, tetraethylene glycol dimethacrylate, polyethylene glycol dimethacrylates having an average molecular weight in the range from 200 to 2000, ethylene glycol diacrylate, diethylene glycol diacrylate, triethylene glycol diacrylate, tetraethylene glycol diacrylate, polyethylene glycol diacrylates having an average molecular weight in the range from 200 to 2000, trimethylolpropane ethoxylate trimethacrylate, trimethylolpropane polyethoxylate trimethacrylates having an average molecular weight in the range from 500 to 1500, trimethylolpropane ethoxylate triacrylates having an average molecular weight in the range from 500 to 1500, pentaerythritol diacrylate, pentaerythritol triacrylate, pentaerythritol tetraacrylate, dipentaerythritol diacrylate, dipentaerythritol triacrylate, dipentaerythritol tetraacrylate, dipentaerythritol pentaacrylate, dipentaerythritol hexaacrylate, tripentaerythritol octaacrylate, pentaerythritol dimethacrylate, pentaerythritol trimethacrylate, dipentaerythritol dimethacrylate, dipentaerythritol tetramethacrylate, tripentaerythritol octamethylacrylate, 1,3-butanediol dimethacrylate, sorbitol triacrylate, sorbitol tetraacrylate, sorbitol tetramethacrylate, sorbitol pentaacrylate, sorbitol hexaacrylate, oligoester acrylates, oligoester methacrylates, glycerol di- and triacrylate, 1,4-cyclohexane diacrylate, bisacrylates and bismethacrylates of polyethylene glycols having an average molecular weight from 100 to 1500, ethylene glycol diallyl ether, 1,1,1-trimethylolpropane triallyl ether, pentaerythritol triallyl ether, diallyl succinates and diallyl adipates or mixtures of the above compounds. Preferred multifunctional acrylate oligomers include, but are not limited to acrylated epoxies such as Interez Corporation's Novacure 3701, acrylated polyurethanes such as Sartomer Co.'s C9505, and acrylated polyesters such as Henkel Corp.'s Photomer 5007. Preferred photopolymerizable polymers include, but are not limited to acrylamido substituted cellulose acetate butyrate and cellulose acetate proprionate available from Bomar; acrylated epoxies available from echo resins; acrylated polyesters; acrylated polyethers and acrylated urethanes. Another photopolymerizable polymer is Jaylink 106e which is an acrylamido modified cellulose acetate butyrate polymer manufactured by Bomar Specialties. Such are described in U.S. Pat. Nos. 4,557,951 and 4,490,516. These describe a polymerizable cellulosic ester or ether product capable of homopolymerization or co-polymerization with vinyl monomers. They have a degree of substitution of between 2.0 and 2.9 reacted with an acrylamide reactant containing a methylol group to provide a degree of substitution of from about 0.05 to about 0.5 and to provide a degree of hydroxyl substitution of from about 0.05 to about 0.5. Another photopolymerizable component is Sartomer 9041 which is a pentaacrylate ester manufactured by Sartomer. Other suitable reactive acrylate monomers include both monofunctional and polyfunctional compounds. Such monomers will generally be reaction products of acrylic acid and/or methacrylic acid with one or more mono- or poly-basic, substituted or unsubstituted, alkyl ($c_1$ to $c_{18}$), aryl or aralkyl alcohols. Acrylates in which the alcohol moiety contains a polar substituent (e.g., an hydroxyl, amine, halogen, cyano, heterocyclic or cyclohexyl group) are preferred because crosslinking, or other intermolecular bonding, is promoted thereby. Specifics acrylates include the following: hydroxyethylacrylate, isobornyl acrylate, tetrahydrofurfuryl acrylate, diethylene-glycoldiacrylate, 1,4-butanedioldiacrylate, butylene stearyl acrylate, glycoldiacrylate, neopentyl glycol diacrylate, octylacrylate and decylacrylate (normally in an admixture), polyethyleneglycol diacrylate, trimethylcyclohexyl acrylate, benzyl acrylate, butyleneglycoldiacrylate, polybutyleneglycol diacrylate, tripropyleneglycol diacrylate, trimethylolpropane triacrylate, di-trimethylolpropane tetraacrylate, pentaerythritol tetraacrylate, and dipentaerythritol pentaacrylate. The corresponding methacrylate compounds are also useful. The organic, free radical polymerizable component is present in an amount sufficient to polymerize or crosslink upon exposure to sufficient actinic radiation, principally, electron beam or ultraviolet radiation. As used herein, the term oligomer or polymer is intended to refer not only to molecular chains normally designated as such in the art, typically containing from two to ten monomer units, but also to low-molecular weight polymers. For the purpose of this invention, the term oligomer or polymer also encompass any polymerized molecule having a molecular weight sufficiently low to permit the overall composition to remain in the liquid state under vacuum at a temperature lower than its temperature of thermal decomposition. A typical maximum molecular weight is approximately 5,000. The molecular weight depends on the specific monomer used, but it is understood that greater molecular weights are included in the practice of the invention so long as the overall composition remains a liquid under the vacuum conditions. Therefore, the invention is not to be limited to polymeric chains with molecular weight less than about 5,000, but is intended to include any polymeric molecule, herein defined as oligomeric, such that the composition remains a liquid at the temperature and pressure of its intended use and a temperature lower than the temperature at which it decomposes or otherwise degrades.

The, cationic polymerizable component may comprise from about 1% to about 99% of the non-solvent parts of the radiation curable liquid composition, more preferably from about 10% to about 90%, and most preferably from about 30% to about 70%.

The cationic polymerization initiator may comprise from about 0.1% to about 10% of the non-solvent parts of the radiation curable liquid composition, more preferably from about 0.2% to about 5%, and most preferably from about 0.3% to about 3%.

When the ethylenically unsaturated (meth)acrylate monomer, oligomer and/or polymer is employed, it may be present in an amount of from more than 0 wt. % to about 95 wt. % based on the weight of the overall composition. In another embodiment, the ethylenically unsaturated (meth)acrylate monomer, oligomer and/or polymer may be present in an amount of from about 5 wt. % to about 80 wt. % based on the weight of the overall composition. In yet another embodiment, the ethylenically unsaturated (meth)acrylate monomer, oligomer and/or polymer may be present in an amount of from about 15 wt. % to about 30 wt. % based on the weight of the overall composition.

The radiation curable liquid composition may comprise a free radical polymerization initiator component which preferably photolytically generates free radicals. Examples of free radical generating components include photoinitiators which themselves photolytically generate free radicals by a fragmentation or Norrish type 1 mechanism. These latter have a carbon-carbonyl bond capable of cleavage at such bond to form two radicals, at least one of which is capable of photoinitiation. Suitable initiators include aromatic ketones such as benzophenone, acrylated benzophenone, 2-ethylanthraquinone, phenanthraquinone, 2-tert-butylanthraquinone, 1,2-benzanthraquinone, 2,3-benzanthraquinone, 2,3-dichloronaphthoquinone, benzyl dimethyl ketal and other aromatic ketones, e.g. benzoin, benzoin ethers such as benzoin methyl ether, benzoin ethyl ether, benzoin isobutyl ether and benzoin phenyl ether, methyl benzoin, ethyl benzoin and other benzoins; diphenyl-2,4,6-trimethyl benzoylphosphine oxide; bis (pentafluorophenyl)titanocene;

The free radical generating component may comprise a combination of radical generating initiators which generate free radicals by a Norrish type 1 mechanism and a spectral sensitizer. Such a combination includes 2-methyl-1-[4-(methylthiophenyl]-2-morpholinopropanone available from Ciba Geigy as Irgacure 907 in combination with ethyl Michler's ketone (EMK) which is 4,4'-bisdiethylaminobenzophenone; Irgacure 907 in combination with 2-isopropylthioxanthanone (ITX); benzophenone in combination with EMK; benzophenone in combination with ITX; 2-benzyl-2-N,N-dimethylamino-1-(4-morpholinophenyl)-1-butanone which is available from Ciba-Geigy as Irgacure 369 in combination with EMK; Irgacure 369 in combination with ITX. In such cases, it is preferred that the weight ratio of radical polymerization initiator and spectral sensitizer ranges from about 5:1 to about 1:5. Other free radical polymerization initiators useful for this invention non-exclusively include triazines, such as chlorine radical generators such as 2-substituted-4,6-bis(trihalomethyl)-1,3,5-triazines. The foregoing substitution is with a chromophore group that imparts spectral sensitivity to the triazine to a portion of the electromagnetic radiation spectrum. Non-exclusive examples of these radical generators include 2-(4-methoxynaphth-1-yl)-4,6-bis(trichloromethyl)-1,3,5,-triazine which is available commercially from PCAS, Longjumeau Cedex (France) as Triazine B; 2-(4-methylthiophenyl)-4,6-bis(trichloromethyl)-1,3,5,-triazine; 2-(4-methoxystyryl)-4,6-bis(trichloromethyl)-1,3,5-triazine; 2-(4-diethylaminophenyl-1,3-butadienyl)-4,6-bis(trichloromethyl)-1,3,5-triazine, among others. Also useful for the invention are Norrish type II mechanism compounds such as combinations of thioxanthones such as ITX and a source of abstractable hydrogen such as triethanolamine. In addition to the compounds identified above useful free radical photoinitiators include hexyltriaryl borates, camphorquinone, dimethoxy-2-phenylacetophenone (IRGACURE 651); 2-benzyl-2-N,N-dimethylamino-1-(4-morpholinophenyl)-1-butanone (IRGACURE 369); and 2-hydroxy-2-methyl-1-phenyl-propane-1-one (DAROCURE 1173), as well as the photoinitiators disclosed in U.S. Pat. No. 4,820,744, particularly at line 43, column 4, through line 7, column 7 (which disclosure is incorporated hereinto by reference thereto). Suitable alternative UV/visible photoinitiators include DAROCUR 4265, which is a 50 percent solution of 2,4,5-trimethyl benzoyl diphenyl-phosphine oxide in DAROCUR 1173, and IRGACURE 819, phosphine oxide, phenyl-bis(2,4,6-trimethyl)benzoyl; TPO (2,4,5-trimethyl (benzoyl)diphenylphosphine oxides); DAROCUR 1173 (HMPP) (2-hydroxymethyl-1-phenyl propanone); IRGACURE 184 (HCPK) (1-hydroxycyclohexyl phenyl ketone); IRGACURE 651 (BDK) (benzyldimethyl ketal, or 2,2 dimethoxyl-2-phenylacetophenone); an equal parts mixture of benzophenone and BM611 (N-3-dimethylaminopropyl methacrylamide); an equal parts mixture of DAROCUR 1173 and ITX (isopropyl thioxanthone [mixture of 2 and 4 isomers]; IRGACURE 369 (2-benzyl-2-N,N-dimethylamino-1-(4-morpholinophenyl)-1 butanone); IRGACURE 907 (2-methyl-1-[4-(methylthiophenyl]-2-morpholinopropanone); IRGACURE 2959 (4-(2-hydroxyethoxy)phenyl-(2-hydroxy-2-methylpropyl) ketone); an equal parts mixture of UVI-6990 and IRGACURE 819; and camphorquinone. Products identified hereinabove and hereinafter by the IRGACURE and DAROCUR designations are available from Ciba Specialty Chemicals Company; UVI-6990 is available from Dow Chemical Company. Free radical initiators further enhance of the rate of electron beam and ultra violet light induced polymerization. Preferred are anthracene, isopropylthioxanthone or phenothiazine, which is capable of transferring energy from the visible and high ultra-violet ranges of light spectra down to lower wavelength ultra-violet ranges.

When the free radical polymerization initiator component is used, it is preferably present in an amount sufficient to effect polymerization of the polymerizable compound upon exposure to sufficient actinic radiation. The polymerization initiator may comprise from about 0.1% to about 50% of the non-solvent parts of the radiation-curable liquid composition, more preferably from about 0.1% to about 10%.

In another embodiment, the composition further comprises one or more inert polymers. Useful polymers non-exclusively include acrylate polymers, methacrylate polymers, rosin esters, rosin ester derivatives, acrylic polymers, urethane polymers, epoxy polymers and ketone polymers, and the like. The choice and amount of polymer may be selected by the skilled artisan to give the desired viscosity to the overall composition.

When the inert polymer is employed, it may be present in an amount of from more than 0 wt. % to about 30 wt. % based on the weight of the overall composition. In another embodiment, the inert polymer may be present in an amount of from about 5 wt. % to about 15 wt. % based on the weight of the overall composition. In yet another embodiment, the inert polymer may be present in an amount of from about 8 wt. % to about 12 wt. % based on the weight of the overall composition.

The composition may further comprise one or more of waxes, pigments, and/or wetting agents. Suitable waxes non-exclusively include polyethylene waxes, polyamide waxes, Teflon waxes, Carnauba waxes, or combinations thereof, which when present are in amounts of from about 0.1 wt. % to about 3 wt. %, preferably from about 0.25 wt. % to about 0.5 wt. % based on the weight of the overall composition. Suitable wetting agents non-exclusively include polysiloxanes, polyacrylics, linear and branched polyalkoxyalate compounds, or combinations thereof, which when present are in amounts of from about 0.25 wt. % to about 2 wt. %, preferably from about 0.5 wt. % to about 1 wt. % based on the weight of the overall composition.

The radiation curable liquid composition preferably includes a colorant such as a pigment or dye. Suitable pigments non-exclusively include Violet Toner VT-8015 (Paul Uhlich); Paliogen Violet 5100 (BASF); Paliogen Violet 5890 (BASF); Permanent Violet VT 2645 (Paul Uhlich); Heliogen Green L8730 (BASF); Argyle Green XP111-S (Paul Uhlich); Brilliant Green Toner GR 0991 (Paul Uhlich); Lithol Scarlet D3700 (BASF); Solvent Red 49; Pigment red 57:1; Toluidine Red (Aldrich); Scarlet for Thermoplast NSD PS PA (Ugine Kuhlmann of Canada); E.D. Toluidine Red (Aldrich); Lithol Rubine Toner (Paul Uhlich); Lithol Scarlet 4440 (BASF); Bon Red C (Dominion Color Company); Royal Brilliant Red RD-8192 (Paul Uhlich); Oracet Pink RF (Ciba-Geigy); Paliogen Red 3871K (BASF); Paliogen Red 3340 (BASF); Lithol Fast Scarlet L4300 (BASF); Solvent Blue 808; Heliogen Blue L6900, L7020 (BASF); Heliogen Blue K6902, K6910 (BASF); Heliogen Blue D6840, D7080 (BASF); Sudan Blue OS (BASF); Neopen Blue FF4012 (BASF); PV Fast Blue B2G01 (American Hoechst); Irgalite Blue BCA or Irgalite Blue NGA (Ciba-Geigy); Paliogen Blue 6470 (BASF); Sudan II (Red Orange) (Matheson, Colemen Bell); Sudan II (Orange) (Matheson, Colemen Bell); Sudan Orange G (Aldrich), Sudan Orange 220 (BASF); Paliogen Orange 3040 (BASF); Ortho Orange OR 2673 (Paul Uhlich); Solvent Yellow 162; Paliogen Yellow 152, 1560 (BASF); Lithol Fast Yellow 0991 K (BASF); Paliotol Yellow 1840 (BASF); Novopern Yellow FGL (Hoechst); Permanent Yellow YE 0305 (Paul Uhlich); Lumogen Yellow D0790 (BASF); Suco-Yellow L1250 (BASF); Suco-Yellow D1355 (BASF); Suco Fast Yellow D1355, D1351 (BASF); Hansa bril yellow SGX 03(B); Hostaperm Pink E; Fanal Pink D4830 (BASF); Cinquasia Magenta (Du Pont); Paliogen Black L0084 (BASF); Pigment Black K801 (BASF); and carbon blacks such as REGAL 330® (Cabot), Carbon Black 5250, Carbon Black 5750 (Columbia Chemical), and the like. Examples of suitable dyes also include Pontomine; Food Black 2; Carodirect Turquoise FBL Supra Conc. (Direct Blue 199), available from Carolina Color and Chemical; Special Fast Turquoise 8 GL Liquid (Direct Blue 86), available from Mobay Chemical; Intrabond Liquid Turquoise GLL (Direct Blue 86), available from Crompton and Knowles; Cibracron Brilliant Red 38-A (Reactive Red 4), available from Aldrich Chemical; Drimarene Brilliant Red X-2B (Reactive Red 56), available from Pylam, Inc.; Levafix Brilliant Red E4B, available from Mobay Chemical; Levafix Brilliant Red E6-BA, available from Mobay Chemical; Procion Red H8B (Reactive Red 31), available from ICI America; Pylam Certified D&C Red #28 (Acid Red 92), available from Pylam; Direct Brill Pink B Ground Crude, available from Crompton and Knowles; Cartasol Yellow GTF Presscake, available from Sandoz, Inc.; Tartrazine Extra Conc. (FD&C Yellow #5, Acid Yellow 23), available from Sandoz, Inc.; Carodirect Yellow RL (Direct Yellow 86), available from Carolina Color and Chemical; Cartasol Yellow GTF Uquid Special 110, available from Sandoz, Inc.; D&C Yellow #10 (Acid Yellow 3), available from Tricon; Yellow Shade 16948, available from Tricon; Basocid Black.times.34, available from BASF; Carta Black 2GT, available from Sandoz, Inc.; Neozapon Red 492 (BASF); Orasol Red G (Ciba-Geigy); Direct Brilliant Pink B (Crompton & Knowles); Aizen Spilon Red C-BH (Hodogaya Chemical); Kayanol Red 3BL (Nippon Kayaku); Levanol Brilliant Red 3BW (Mobay Chemical); Levaderm Lemon Yellow (Mobay Chemical); Spirit Fast Yellow 3G; Aizen Spilon Yellow C-GNH (Hodogaya Chemical); Sirius Supra Yellow GD 167; Cartasol Brilliant Yellow 4GF (Sandoz); Pergasol Yellow CGP (Ciba-Geigy); Orasol Black RLP (Ciba-Geigy); Savinyl Black RLS (Sandoz); Dermacarbon 2GT (Sandoz); Pyrozol Black BG (ICI); Morfast Black Conc. A (Morton-Thiokol); Diaazol Black RN Quad (ICI); Orasol Blue GN (Ciba-Geigy); Savinyl Blue GLS (Sandoz); Luxol Blue MBSN (Morton-Thiokol); Sevron Blue 5GMF (ICI); Basacid Blue 750 (BASF), and the like. Neozapon Black X51 [C.I. Solvent Black, C.I. 12195] (BASF), Sudan Blue 670 [C.I. 61554] (BASF), Sudan Yellow 146 [C.I. 12700] (BASF), and Sudan Red 462 [C.I. 260501] (BASF) or combinations thereof. For this invention the term pigment includes a conductive powder such as a metal powder of iron, silver, copper aluminum or their alloys, a metal oxide powder, a metal carbide powder, a metal boride powder, carbon black, graphite or combinations thereof.

When a pigment is employed it may be present in the composition in an amount of from above 0 wt. % to about 30 wt. %. In another embodiment, the pigment may be present in an amount of from about 2 wt. % to about 15 wt. % based on the weight of the overall composition. In yet another embodiment, the pigment may be present in an amount of from about 5 wt. % to about 10 wt. % based on the weight of the overall composition.

Other optional components of the overall composition non-exclusively include adhesion promoters, flow control agents, hardness control agents, deaerators, polymerization inhibitors, dispersing agents, rheology modifiers, surfactants, or combinations thereof, provided the overall composition remains a liquid under the temperature and vacuum conditions of the process described herein, and the overall composition is curable under the application of electron beam irradiation. The selection of these optional components and their quantity in the overall composition can easily be determined by the skilled artisan.

The radiation curable, liquid composition is then applied to the surface a suitable substrate in a liquid, i.e. non-vapor, non-gaseous form, under vacuum conditions in a vacuum chamber. Suitable substrates include cellulose derivatives such as cellulose nitrate, cellulose acetate, regenerated cellulose and cellulose ethers such as ethyl and methyl cellulose; polystyrene plastics such as polystyrene and polymers and copolymers of various ring substituted styrenes, for example o-, m- and p-methylstyrene and other ring-substituted styrenes as well as side-chain substituted styrenes such as alpha-, methyl- and ethylstyrene and various other polymerizable and copolymerizable vinylidenes; various vinyl polymers and copolymers such as polyvinyl butyral and other acetals, polyvinyl chloride, polyvinyl acetate and its hydrolysis products, polyvinyl chloride-acetate copolymers; acrylic resins such as polymers and copolymers of methyl acrylate, methyl methacrylate, acrylamide, methylolacrylamide and acrylonitrile; polyamide, polyphenylene sulfide, polyetheretherketone, polyetherketone, polyketone, polyetherimide, polysulfone, polyethersulfone, polyaryletherketone, polyurethane, polyethylene napthalate, polybutylene terephthalate), polyethylene terephthalate, polyamide, polycarbonate, COC, polyoxymethylene, acrylonitrile butadiene styrene, polyvinylchloride, polyphenylene, polyethylene, ethylene/tetrafluoroethylene, (polytetrafluoroethylene, polyesters and unsaturated-modified polyester resins such as those made by condensation of polycarboxylic acids with polyhydric phenols or modified using unsaturated carboxylic acid and further modified by reacting the alkyd with another monomer; polymers of allyl diglycol carbonate. Practical substrates comprise nitrocellulose, polyurethane, polyester, polyolefins, epoxy, acrylic, amide, vinyl, or combinations thereof. Preferred substrates include polyethylene terephthalate and polypropylene. In a preferred embodiment, the substrate is substantially transparent, in particular, substantially transparent to infrared radiation. Preferred substrates include a metal oxide such as silicon oxide or aluminum oxide, a polyimide, a polyamide, a polyvinyl chloride, a polyester, a polyolefin, a metal, or combinations thereof. The substrate has a thickness which is at least sufficient to maintain its integrity as a self-sustaining film. In one embodiment the substrate has a thickness of from about 5 μm to about 700 μm, preferably from about 12 μm to about 100 μm, and more preferably from about 10 μm to about 50 μm.

In a preferred embodiment the substrate has a metalized surface. Typically this metal surface may be applied to the substrate by vapor or vacuum deposition, sputtering, or coating of a metal dispersed in suitable composition. A vacuum metallization process involves placing a roll of the substrate material in a vacuum chamber which also contains a heated crucible containing a metal that is to be deposited. Under high vacuum, the heated metal vaporizes and deposits onto a moving cold web of the substrate material. The process is carried out at high speed inside a vacuum chamber. The film thickness can be adjusted from nanometer to micron thickness precisely and reproducibly. A large number of metals or even mixed metals can be deposited, offering a broad flexibility. Such metals may be any conducting metals, e.g., copper, silver, aluminum, gold, iron, nickel, tin, stainless steel, chromium, zinc, or alloys or combinations thereof. Vapor deposition techniques are well known in the art. Typically, a section of the substrate is introduced into a commercially available vapor coating machine and vapor coated to the desired thickness with the metal. One such machine is a DENTON Vacuum DV-515 bell jar vapor coating machine. The thickness of the deposited electrically conductive metal layer is at a minimum, that amount which forms a continuous layer on the substrate. Usually the layer is thin, i.e. up to about 10 μm, preferably up to about 3 μm. More usually, the thickness of the deposited electrically conductive metal layer ranges from about 5 to about 200 nanometers (nm), for example, from about 10 to 100 nm, e.g. from about 30 to about 80 nm.

The liquid composition may be applied to the surface of a web of the substrate material by any liquid transfer means known in the art such as, for example, by means of a roller coater, an anilox roller, a gravure coater, or a meniscus coater. The composition can be applied using printing techniques such as gravure, and flexography using a printing plate, a letterpress, flexographic plate or synthetic rubber compound based plate. The composition forms a layer having a thickness which is at a minimum, that amount which forms a continuous layer on the substrate, and usually up to about 1 μm. Usually a web of the substrate is coated with the liquid composition at speeds of up to about 10 meters per second.

The next step in the process of the invention is introducing a gas or combination of gases into the vacuum chamber. It is important that the gas, or combination of gases, emits ultraviolet radiation and/or plasma radiation upon exposure to electron beam radiation. The gas or combination of gases is selected such that when passed through the electron generating electrodes of an electron beam generating apparatus inside of the vacuum chamber leads to emission of light containing UV spectral output, that accelerates polymerization or crosslinking of the radiation curable composition. Non-limiting examples of such gases include one or more of argon, oxygen, carbon dioxide, and nitrogen. Others are easily determinable by those skilled in the art. Typical gas flow rates may range from about 1 to about 8 slpm (standard liters per minute)

The gas or combination of gases, as well as the radiation curable composition are then exposed to electron beam radiation. The gas or combination of gases, as well as the radiation curable composition are exposed to sufficient electron beam radiation to generate ultraviolet radiation and or plasma electron radiation with the gas or combination of gases, such that the ultraviolet radiation, plasma radiation and optional electron beam radiation combine to cure, polymerize or crosslink the radiation curable composition to substantially solid form. The amount of energy absorbed, also known as the dose, is measured in units of MegaRads (MR or Mrad) or kiloGrays (kGy), where one Mrad is 10 kGy, one kGy being equal to 1,000 Joules per kilogram. The electron beam dose should be within the range of from about 1 kGy to about 40 kGy, preferably from about 10 kGy to about 30 kGy, and more preferably from about 15 kGy to about 20 kGy, for essentially complete curing. Electron beam radiation is preferably conducted at an electron beam voltage of from about 7 kV to about 15 kV. Moreover, curing is substantially instantaneous and provides a cure percentage at or near one hundred percent. In one embodiment, the plasma radiation dose applied to the composition is controlled by the electron beam voltage and selection of a gas.

In one embodiment the polymerization of said radiation curable composition may be initiated by exposure to gas generated ultraviolet radiation having a wavelength of from about 200 nm to about 410 nm, preferably about 280 nm to about 310 nm. The length of time for exposure is easily determinable by those skilled in the art and depends on the selection of the particular components of the radiation-curable composition. Typically exposure ranges from about 1 second to about 60 seconds, preferably from about 2 seconds to about 30 seconds, and more preferably from about 2 seconds to about 15 seconds. Typical exposure intensities range from about 10 $mW/cm^2$ to about 600 $W/cm^2$, preferably from about 50 $mW/cm^2$ to about 450 $W/cm^2$, and more preferably from about 100 $mW/cm^2$ to about 300 $W/cm^2$.

A feature of the invention is that the liquid composition application and subsequent electron beam radiation application are sequentially conducted in a vacuum chamber. In one embodiment, the radiation curable composition application and electron beam irradiation are conducted at a vacuum of from about $10^{-1}$ bar to about $10^{-5}$ bar, and at a temperature of from about 0° C. to about 80° C.

The following non-limiting examples serve to illustrate the invention.

EXAMPLES

| | Supplier | Example 1 | Example 2 | Example 3 | Example 4 | Example 5 |
|---|---|---|---|---|---|---|
| IsoRad 190 MA Polyurethane methacrylate | SI Group | 19.9 | | 19.9 | | |
| Epoxy metacrylate resin | | | | | 14.9 | 14.9 |
| IsoRad 1850 MA novolac methacrylate resin | SI Group | | 24.9 | | | |
| TMPTMA SR350 metacrylate functional monomer | Sartomer | 80 | 75 | 65 | 85 | 55 |
| HDDMA 1,6 hexane diol methacrylate | Sartomer | | | 15 | | |
| SunFast 249-7084 15:3 blue pigment | Sun Chemical | | | | | 30 |
| N-PAL, inhibitor | IGM | 0.1 | 0.1 | 0.1 | 0.1 | 0.1 |
| Total | | 100 | 100 | 100 | 100 | 100 |

Examples 1-4 were prepared by blending components with high speed mixer. A small sample of each mixture was placed inside of the vacuum chamber for 30 minutes and checked for stability. All samples remained fluid after the test.

Samples of the radiation curable compositions according to Examples 1 and 4 are prepared for applying over a metalized aluminum layer inside of a vacuum chamber via an anilox applicator. The chamber is then filled with argon gas. 5 kGy of electron beam irradiation causes a generation of a plasma and the emission of ultraviolet radiation. The ultraviolet radiation, plasma radiation, and the electron beam radiation impinge upon the radiation curable compositions such that they are cured. Both samples demonstrated good stability under vacuum, forming a uniform layer with good adhesion to aluminum surface.

Example 5 was prepared by first mixing individual components and then grinding them on a three roll mill. The Example 5 components were then mixed with the Example 1 components at a 30:70 ratio which then was transferred via anilox roller and cured similar to Examples 1-4, inside of the vacuum chamber, demonstrating good stability and cure.

Example 6-9

A cationic, radiation curable composition is prepared as follows: 76% by weight of Uvacure 1500, cycloliphatic epoxide available from Cytec; 20% by weight of OXT 221, oxetane available from Toagosei America Inc., and 4% by weight of UV 9390C, a blend of iodonium hexafluoroantimonate and isopropylthiosenthone available from GE. Then a methacrylate based radiation curable composition according to Example 1 is duplicated.

Samples of the radiation curable compositions according to Examples 6 and 9 are prepared and applied over a metalized aluminum layer inside of a vacuum chamber via an anilox applicator. The chamber is then filled with a gas. Argon is filled at 3.5 slpm (standard liters per minute) and oxygen is filled at between 3.0 and 4.0 slpm. Electron beam irradiation causes a generation of a plasma and the emission of ultraviolet radiation. The ultraviolet radiation, plasma radiation, and the electron beam radiation impinge upon the radiation curable compositions such that they are cured. The application speed of the radiation curable compositions to the substrate in feet per minute, vacuum strength, electron beam voltage, electron beam current are given in the following Table 1.

TABLE 1

| | Example 6 | Example 7 | Example 8 | Example 9 |
|---|---|---|---|---|
| Composition | Cationic | Cationic | Cationic | Methacrylate Based |
| Gas | Argon | Argon | Argon | Argon and Oxygen |
| Vacuum, Torr | $10 \times 10^{-3}$ | $2.5 \times 10^{-3}$ | $21 \times 10^{-3}$ | $14 \times 10^{-3}$ |
| EB Voltage, kV | −10 | −10 | −10 | −10 |
| EB Current, mA | 350 | 250 | 400 | 600 |
| Application speed | 400 fpm | 200 fpm | 500 fpm | 200 fpm |

After curing, each of the samples is rubbed five times with a cotton swab saturated with isopropyl alcohol. Each sample passes this solvent resistance test. Each sample is adhered to Scotch 600 brand tape and then the tape is removed. There is essentially no removal of the cured radiation curable compositions by this tape adhesion test.

Examples 10-25

A cationic, radiation curable composition is prepared having the following composition:

| Product | Supplier | % |
|---|---|---|
| Uvacure 1500, cycloliphatic epoxide | Cytec | 78 |
| OXT 221, oxetane | TOAGOSEI AMERICA INC. | 20 |
| UV 1600 iodonium hexafluorophosphate | Cytec | 2 |
| | | 100 |

Samples of the radiation curable compositions according to Examples 6 and 9 are prepared and applied over a metalized aluminum layer inside of a vacuum chamber via an anilox applicator. The chamber is then filled with a gas. Electron beam irradiation causes a generation of a plasma and the emission of ultraviolet radiation. The ultraviolet radiation, plasma radiation, and the electron beam radiation impinge upon the radiation curable compositions such that they are cured. The application speed of the radiation curable compositions to the substrate in feet per minute, vacuum strength, electron beam voltage, electron beam current are given in the following Table 2.

Conditions:

Vacuum pressure less than $1\times10^{-3}$ Torr.

Electron Beam:

Cathode 1: Set point Voltage=10 KV, current=350 mA for the entire run.

Cathode 2: Set point Voltage=9 KV, current=300 mA for the entire run

TABLE 2

RESULTS

| | Example 10 | Example 11 | Example 12 | Example 13 | Example 14 |
|---|---|---|---|---|---|
| Gas | Ar | Ar | Ar | $N_2$ | $N_2$ |
| Line speed, fpm | 200 | 400 | 600 | 200 | 400 |
| Back transfer, % | 0 | less than 10 | less than 50 | 0 | less than 10 |
| IPA rubs | over 100 | 70 | 50 | 70 | 60 |

A low percentage of back transfer and high number of IPA (isopropanol rubs) indicate better cure.

| | Example 15 | Example 16 | Example 17 | Example 18 | Example 19 |
|---|---|---|---|---|---|
| Gas | $N_2$ | $CO_2$ | $CO_2$ | $CO_2$ | Helium* |
| Line speed, fpm | 600 | 200 | 400 | 600 | 200 |
| Back transfer, % | over 50 | 0 | less than 10 | over 75 | 100 |
| IPA rubs | 50 | 80 | 50 | 50 | 0 |

*No plasma generation

TABLE 2-continued

| | Example 20 | Example 21 | Example 22 | Example 23 | Example 24 | Example 25 |
|---|---|---|---|---|---|---|
| Gas | $Ar/O_2$ (80:20) | $Ar/O_2$ (80:20) | $Ar/O_2$ (80:20) | $O_2$ | $O_2$ | $O_2$ |
| Line speed, fpm | 200 | 400 | 600 | 200 | 400 | 600 |
| Back transfer, % | 80 | 60 | 60 | 70 | 60 | 50 |
| IPA rubs | 0 | 0 | less than 20 | 0 | less than 20 | less than 50 |

Examples 26 to 28

Example 10 is duplicated with the following composition.

| Coating Composition: | | |
|---|---|---|
| Product | Supplier | % |
| Uvacure 1500, cycloliphatic epoxide | Cytec | 74.75 |
| OXT 221, oxetane | TOAGOSEI AMERICA INC. | 20 |
| Tryarilsulfonium hexafluorophosphate, 50% solution in propylene carbonate | Aalchem | 2.5 |
| Triarylsulfonium sulfonium hexafluoroantimonate, 50% solution in propylene carbonate | Aalchem | 2.5 |
| 2-isopropylthioxanthone | Aalchem | 0.25 |
| | | 100 |

TABLE 3

| RESULTS | | |
|---|---|---|
| | Example 26 | Example 27 |
| Gas | Ar | Ar |
| Line speed, fpm | 200 | 400 |
| Back transfer, % | 0 | 0 |
| IPA rubs | over 100 | over 100 |

Example 28

The same coating tested under AEB electron beam at 100 kV, 30 kGy electron beam conducted under atmospheric pressure without generation of plasma or UV irradiation produced no cure.

These examples demonstrate that presence of plasma and UV irradiation is important for achieving high rate of cure. Plasma and UV curing efficiency in vacuum is dependent on selection of gas. For example, use of Ar generate better cure than use of $CO_2$ or $N_2$. Helium doesn't generate plasma and UV and as a result doesn't lead to cure. Examples 26 and 27 illustrate high curing efficiency of triarylsulfonium salt photoinitiators in vacuum under exposure to Ar generated plasma and UV. The same photoinitiators would not produce any cure under exposure to EB irradiation under atmospheric pressure without exposure to plasma and UV irradiation.

While the present invention has been particularly shown and described with reference to preferred embodiments, it will be readily appreciated by those of ordinary skill in the art that various changes and modifications may be made without departing from the spirit and scope of the invention. It is intended that the claims be interpreted to cover the disclosed embodiment, those alternatives which have been discussed above and all equivalents thereto.

What is claimed is:

1. A process for coating a substrate which comprises a) applying a radiation curable, liquid composition onto a surface of a substrate under vacuum conditions in a vacuum chamber, which composition comprises components which do not go into a gas phase or a vapor phase under said vacuum conditions, said composition comprising a first component which is polymerizable or crosslinkable in the presence of a sufficient amount of an acid; and a cationic photoinitiator which generates a sufficient amount of an acid upon exposure to sufficient ultraviolet radiation, electron beam radiation, plasma radiation or combinations of two or more of ultraviolet radiation, electron beam radiation and plasma radiation, to cause polymerizing or crosslinking of the first component;

b) introducing a gas into said chamber, which gas emits ultraviolet radiation, plasma radiation, or combinations of ultraviolet radiation and plasma radiation upon exposure to electron beam radiation; and c) exposing the gas to sufficient electron beam radiation to cause the gas to emit ultraviolet radiation, plasma radiation, or combinations of ultraviolet radiation and plasma radiation, thus exposing the composition to ultraviolet radiation, plasma radiation, or combinations of ultraviolet radiation and plasma radiation, which causes the cationic photoinitiator to generate acid, which acid causes polymerizing or crosslinking of the first component.

2. The process of claim 1 further comprising exposing the composition to sufficient electron beam radiation to cause the cationic photoinitiator to generate a sufficient amount of an acid and thereby cause polymerizing or crosslinking of the first component.

3. The process of claim 1 wherein the gas comprises one or more of argon, oxygen, carbon dioxide, and nitrogen.

4. The process of claim 1 wherein the first component comprises at least one of an oxirane ring containing compound, a vinylether containing compound, and an oxetane containing compound.

5. The process of claim 1 wherein the gas exists between electron generating electrodes of an electron beam generating apparatus inside of the vacuum chamber.

6. The process of claim 1 wherein the cationic photoinitiator comprises an onium salt.

7. The process of claim 1 wherein the cationic photoinitiator comprises one or more of a diazonium salt, sulfonium salt, iodonium salt, selenonium salt, bromonium salt, sulfoxonium salt, and chloronium salt.

8. The process of claim 1 wherein the cationic photoinitiator comprises a diaryl iodonium salt, a triaryl sulfonium salt or mixtures thereof.

9. The process of claim 1 wherein the radiation curable liquid composition comprises an organic, free radical polymerizable ethylenically unsaturated component which is polymerizable or crosslinkable by the application of sufficient electron beam radiation and/or ultraviolet radiation.

10. The process of claim 1 wherein the radiation curable liquid composition comprises an ethylenically unsaturated acrylate monomer, methacrylate monomer, acrylate oligomer, methacrylate oligomer, acrylate polymer, methacrylate polymer or combinations thereof.

11. The process of claim 1 wherein the radiation curable liquid composition comprise a free radical polymerization initiator.

12. The process of claim 1 wherein the composition comprises at least one of an anthracene photosensitizer, an isopropylthioxanthone photosensitizer, and a phenothiazine photosensitizer.

13. The process of claim 1 wherein the composition further comprises one or more polymers selected from acrylate polymers, methacrylate polymers, rosin esters, rosin ester derivatives, urethane polymers, epoxy polymers and ketone polymers.

14. The process of claim 1 wherein the first component comprises an ethylenically unsaturated component which comprises from about 5 wt. % to about 100 wt. % of an ethylenically unsaturated acrylate monomer, methacrylate monomer, or combinations thereof.

15. The process of claim 1 comprising coating the liquid composition onto the surface of the substrate by means of a roller coater, an anilox roller, a gravure coater, or a meniscus coater.

16. The process of claim 1 wherein the substrate comprises a metal oxide, a polyimide, a polyamide, a polyvinyl chloride, a polyester, a polyolefin, a metal, or combinations thereof.

17. The process of claim 1 wherein the surface of the substrate comprises a metal comprising one or more of aluminum, copper, nickel, iron, silver, gold, tin, stainless steel, chromium, zinc or alloys or combinations thereof.

18. The process of claim 1 wherein the electron beam radiation is conducted with an electron beam dose of from about 1 kGy to about 40 kGy with an electron beam voltage of from about 7 kV to about 15 kV.

19. The process of claim 1 wherein the vacuum conditions are from about $10^{-1}$ bar to about $10^{-5}$ bar, and at a temperature of from about 0° C. to about 80° C.

20. The process of claim 1 wherein the exposing of the composition to gas generated ultraviolet radiation is conducted at a wavelength of from about 200 nm to about 410 nm for from about 1 second to about 60 seconds at from about 10 $mW/cm^2$ to about 600 $W/cm^2$.

* * * * *